United States Patent
Yang et al.

(10) Patent No.: US 12,164,170 B2
(45) Date of Patent: Dec. 10, 2024

(54) SPACER AND LENS ASSEMBLY INCLUDING SPACER

(71) Applicant: SAMSUNG ELECTRO-MECHANICS CO., LTD., Suwon-si (KR)

(72) Inventors: Dong Shin Yang, Suwon-si (KR); Ho Sik Yoo, Suwon-si (KR); Sot Eum Seo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 946 days.

(21) Appl. No.: 17/149,034

(22) Filed: Jan. 14, 2021

(65) Prior Publication Data
US 2021/0302684 A1 Sep. 30, 2021

(30) Foreign Application Priority Data

Mar. 25, 2020 (KR) .......................... 10-2020-0036451
Sep. 16, 2020 (KR) .......................... 10-2020-0119202

(51) Int. Cl.
*G02B 7/02* (2021.01)

(52) U.S. Cl.
CPC .................................. *G02B 7/021* (2013.01)

(58) Field of Classification Search
CPC .......... G02B 7/02; G02B 7/021; G02B 7/022; G02B 7/023; G02B 7/025; G02B 7/026; G02B 7/027; G02B 7/028; G02B 5/003; G02B 5/005; G02B 27/0025; G02B 5/0215; G02B 5/0221; G02B 1/11; G03F 7/70941
See application file for complete search history.

(56) References Cited

U.S. PATENT DOCUMENTS

| | | | |
|---|---|---|---|
| 5,607,216 A | 3/1997 | Kaneko et al. | |
| 10,527,756 B2 | 1/2020 | Chou | |
| 2006/0227834 A1* | 10/2006 | Yoshikawa | G02B 1/118 372/50.11 |
| 2006/0291076 A1* | 12/2006 | Watanabe | G02B 7/026 359/811 |
| 2007/0247718 A1* | 10/2007 | Yoshikawa | G02B 5/003 359/614 |
| 2009/0185065 A1* | 7/2009 | Ohno | G02B 5/005 348/E9.003 |
| 2014/0204476 A1 | 7/2014 | Takase et al. | |

(Continued)

FOREIGN PATENT DOCUMENTS

| | | |
|---|---|---|
| CN | 110196477 A | 9/2019 |
| JP | H08-98118 A | 4/1996 |

(Continued)

OTHER PUBLICATIONS

Taiwanese Office Action issued on Oct. 21, 2022, in counterpart Taiwanese Patent Application No. 110102482 (11 pages in English, 14 pages in Chinese).

(Continued)

*Primary Examiner* — Ephrem Z Mebrahtu
(74) *Attorney, Agent, or Firm* — NSIP Law

(57) ABSTRACT

A spacer includes: an opening through which light passes; an inner side surface forming the opening; and a protruding portion including a plurality of protrusions protruding from the inner side surface. Lengths of the plurality of protrusions vary in a circumferential direction of the protruding portion.

19 Claims, 9 Drawing Sheets

(56) References Cited

U.S. PATENT DOCUMENTS

| | | | |
|---|---|---|---|
| 2015/0253532 A1 | 9/2015 | Lin | |
| 2015/0253569 A1 | 9/2015 | Lin | |
| 2016/0170204 A1* | 6/2016 | Liang | G02B 7/021 359/738 |
| 2017/0351048 A1* | 12/2017 | Chi | G02B 5/003 |
| 2018/0024309 A1* | 1/2018 | Wei | G02B 7/022 359/740 |
| 2018/0164532 A1* | 6/2018 | Wei | G02B 7/026 |
| 2018/0196171 A1* | 7/2018 | Hsu | G02B 5/005 |
| 2018/0246260 A1* | 8/2018 | Chou | G02B 27/0018 |
| 2018/0335607 A1* | 11/2018 | Lin | G02B 7/021 |
| 2019/0324172 A1* | 10/2019 | Chou | G02B 1/111 |
| 2020/0088972 A1 | 3/2020 | Yoo et al. | |
| 2022/0043325 A1* | 2/2022 | Huang | G02B 27/0018 |

FOREIGN PATENT DOCUMENTS

| | | |
|---|---|---|
| KR | 10-2020-0031512 A | 3/2020 |
| TW | M502858 U | 6/2015 |

OTHER PUBLICATIONS

Korean Office Action issued on Sep. 5, 2022, in counterpart Korean Patent Application No. 10-2020-0119202 (8 pages in English, 5 pages in Korean).

\* cited by examiner

SPACER AND LENS ASSEMBLY INCLUDING SPACER

CROSS-REFERENCE TO RELATED APPLICATIONS

This application claims the benefit under 35 U.S.C. § 119 (a) of Korean Patent Application No. 10-2020-0036451 filed on Mar. 25, 2020 and Korean Patent Application No. 10-2020-0119202 filed on Sep. 16, 2020, in the Korean Intellectual Property Office, the entire disclosures of which are incorporated herein by reference for all purposes.

BACKGROUND

1. Field

The following description relates to a spacer and a lens assembly including a spacer.

2. Description of Related Art

Camera modules may be employed in portable electronic devices such as smartphones.

A camera module may include a lens assembly including lenses, and a spacer may be disposed between the lenses. An opening through which light passes is provided in the spacer. When the light passes close to the inner wall of the opening, a diffraction phenomenon may occur. The diffraction phenomenon may cause the occurrence of a flare. When a flare occurs, image quality deteriorates.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a spacer includes: an opening through which light passes; an inner side surface forming the opening; and a protruding portion including a plurality of protrusions protruding from the inner side surface. Lengths of the plurality of protrusions vary in a circumferential direction of the protruding portion.

The protruding portion may further include a region in which lengths of protrusions, among the plurality of protrusions, increase in the circumferential direction and another region in which lengths of other protrusions, among the plurality of protrusions, decrease in the circumferential direction.

The lengths of the plurality of protrusions may alternately increase and decrease in the circumferential direction, repeatedly.

The opening may include a first region, a second region, a third region and a fourth region separated by a first axis and a second axis that intersect on a center of the opening and are disposed perpendicular to each other. The first region and the third region may be located opposite to each other based on the center of the opening. The second region and the fourth region may be located opposite to each other based on the center of the opening. Lengths of protrusions, among the plurality of protrusions, disposed in the first region and the third region, may increase in the circumferential direction. Lengths of protrusions, among the plurality of protrusions, disposed in the second region and the fourth region may decrease in the circumferential direction.

The protruding portion may further include a first protruding portion disposed on one side of a first axis and a second protruding portion disposed on another side of the first axis, the first axis intersecting a central axis of the opening and being perpendicular to the central axis of the opening. Lengths of protrusions, among the plurality of protrusions, included in the first protruding portion and lengths of protrusions, among the plurality of protrusions, included in the second protruding portion may increase and then decrease in the circumferential direction.

A center of a first circle having an arc as a curve connecting vertices of the protrusions included in the first protruding portion, and a center of a second circle having an arc as a curve connecting vertices of the protrusions included in the second protruding portion, may be spaced apart from each other.

A center of the opening may be disposed between the center of the first circle and the center of the second circle.

The first circle and the second circle may have an intersection point. The first protruding portion may be disposed in a space between an outer side of the first circle and an inner side of the second circle. The second protruding portion may be disposed in a space between an inner side of the first circle and an outer side of the second circle.

A diameter of the first circle and a diameter of the second circle may be equal.

Each protrusion among the plurality of protrusions may include a convex curved surface or a concave curved surface.

The protruding portion may further include a first protruding portion, a second protruding portion, a third protruding portion, and a fourth protruding portion disposed in a sequence in the circumferential direction. Lengths of protrusions, among the plurality of protrusions, included in each of the first to fourth protruding portions may increase and then decrease in the circumferential direction.

The first protruding portion and the third protruding portion may be located opposite to each other with respect to a center of the opening, and the second protruding portion and the fourth protruding portion may be located opposite to each other with respect to the center of the opening. A center of a first circle having an arc as a curve connecting vertices of the protrusions included in the first protruding portion, and a center of a second circle having an arc as a curve connecting vertices of the protrusions included in the third protrusion, may be spaced apart from each other.

A center of a third circle having an arc as a curve connecting vertices of the protrusions included in the second protruding portion, and a center of a fourth circle having an arc as a curve connecting vertices of the protrusions included in the fourth protruding portion, may be spaced apart from each other.

The center of the opening may be disposed at a position inside of positions of the center of the first circle, the center of the second circle, the center of the third circle, and the center of the fourth circle.

The first circle and the second circle may have an intersection point. The first protruding portion may be disposed in a space between an outer side of the first circle and an inner side of the second circle. The third protruding portion may be disposed in a space between an inner side of the first circle and an outer side of the second circle.

The third circle and the fourth circle may have an intersection point. The second protruding portion may be disposed in a space between an outer side of the third circle and an inner side of the fourth circle. The fourth protruding portion may be disposed in a space between an inner side of the third circle and an outer side of the fourth circle.

In another general aspect, a lens assembly includes: a lens barrel; a first lens and a second lens disposed along an optical axis inside of the lens barrel; and a spacer disposed between the first lens and the second lens, and having an opening. A protruding portion including a plurality of protrusions protruding toward a center of the opening is disposed on an inner side surface of the spacer forming the opening. Lengths of the plurality of protrusions vary in a circumferential direction of the protruding portion.

In another general aspect, a lens assembly includes: a first lens disposed in a lens barrel; a second lens disposed in the lens barrel and stacked on the first lens in an optical axis direction; and a spacer disposed between the first lens and the second lens in the optical axis direction. The spacer includes: a ring-shaped body having an inner side surface bounding an opening configured to allow light to pass through the spacer in the optical axis direction; and a plurality of protrusions extending toward a center of the opening in a plane perpendicular to the optical axis direction. Lengths of the plurality of protrusions in directions toward the center of the opening vary.

Lengths, in the directions toward the center of the opening, of protrusions, among the plurality of protrusions, may increase in a circumferential direction of the ring-shaped body. Lengths, in the directions toward the center of the opening, of other protrusions, among the plurality of protrusions, may decrease in the circumferential direction of the ring-shaped body.

The lengths of the plurality of protrusions may alternately increase and decrease in a circumferential direction, repeatedly of the ring-shaped body.

Each protrusion, among the plurality of protrusions, may have any one of a sawtooth shape, a convex curved surface, and a concave curved surface.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
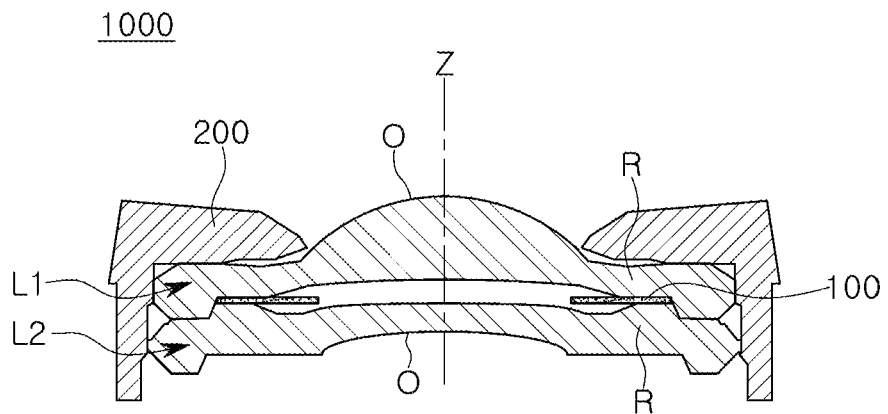
FIG. 1 is a schematic cross-sectional view of a lens assembly, according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed, as will be apparent after gaining an understanding of this disclosure, with the exception of operations necessarily occurring in a certain order. Also, descriptions of features known in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various ways as will be apparent after gaining an understanding of the disclosure of this application. Further, although the examples described herein have a variety of configurations, other configurations are possible as will be apparent after gaining an understanding of the disclosure of this application.

FIG. 1 is a schematic cross-sectional view of a lens assembly 1000, according to an example.

Referring to FIG. 1, the lens assembly 1000 may include a lens barrel 200 and a plurality of lenses disposed in the lens barrel 200.

The lenses are disposed in the lens barrel 200 along an optical axis Z. The lenses may be spaced apart from each other by a predetermined distance along the optical axis Z.

The plurality of lenses may include, for example, a first lens L1 and a second lens L2. For example, the plurality of lenses may include the first lens L1 and the second lens L2 disposed from the object side toward an image sensor side.

In the disclosure herein, the plurality of lenses are described as including the first lens L1 and the second lens L2, but the disclosure is not limited to any particular number of lenses, and the plurality of lenses may include three or more lenses.

The first lens L1 and the second lens L2 each include an optical unit (or optical region) O and a rib R.

The optical unit O may be a part in which the optical performance of the lens L1/L2 is exhibited. For example, light may be refracted while passing through the optical unit O. The optical unit O of the first lens L1 and the optical unit O of the second lens L2 may be spaced apart from each other by a predetermined distance along the optical axis.

The rib R may be configured to fix the lens to another structure or component, for example, the lens barrel 200 or another lens. The rib R extends around the optical unit and may be formed integrally with the optical unit O. The rib R of the first lens L1 and the rib R of the second lens L2 may contact each other.

A spacer 100 is disposed between adjacent lenses. For example, the spacer 100 is disposed between the first lens L1 and the second lens L2.

The spacer 100 may maintain a gap between the first lens L1 and the second lens L2, and may block unnecessary light.

At least a portion of each of the rib R of the first lens L1 and the rib R of the second lens L2 is in contact with the spacer 100.

The spacer 100 may be provided with a light blocking layer to block unnecessary light. The light blocking layer may be a black film or black iron oxide, for example.

The spacer 100 may be formed of a metal material. For example, the spacer 100 may be formed of a non-ferrous metal material. As an example, the spacer 100 may be formed of a phosphor bronze material.

Figure 2:
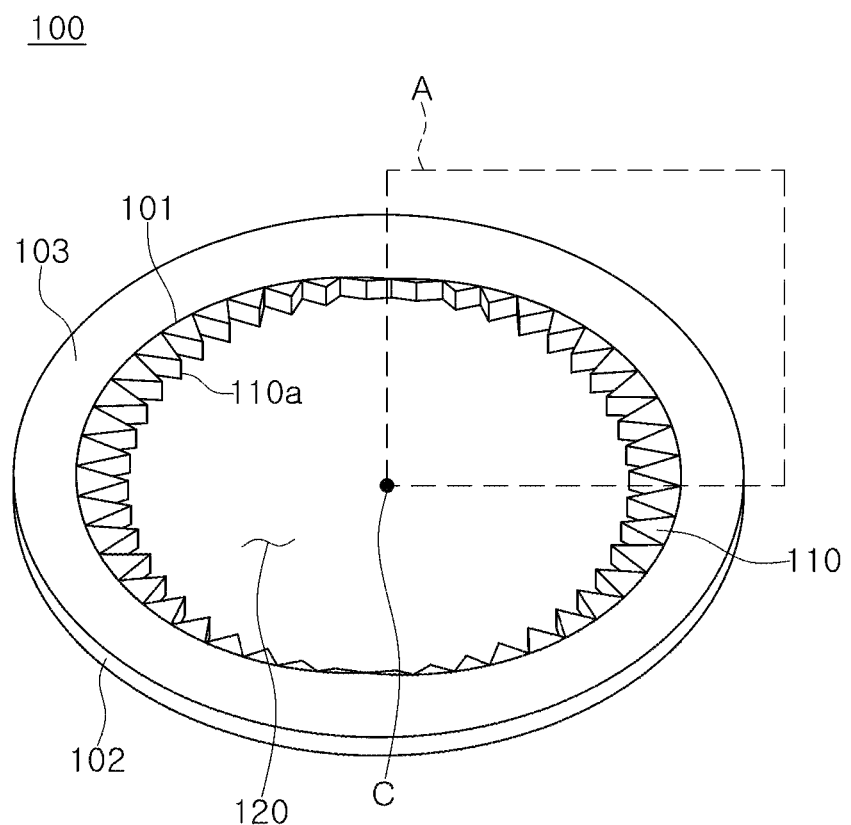
FIG. 2 is a perspective view of a spacer, according to an example.

Referring to FIG. 2, the spacer 100 includes an opening 120 through which light passes. The light that is refracted while passing through the first lens L1 passes through the opening 120, and passes through the second lens L2 to be refracted again.

Still referring to FIG. 2, the spacer 100 has an inner side surface 101 and an outer side surface 102, and has a body portion 103 disposed between the inner side surface 101 and the outer side surface 102. The body portion 103 may have a ring shape.

The opening 120 may be formed by the inner side surface 101 of the spacer 100. For example, a space surrounded by the inner side surface 101 of the spacer 100 is configured as the opening 120.

The inner side surface 101 and the outer side surface 102 of the spacer 100 respectively surround a center C of the opening 120 of the spacer 100. A distance from the center C of the opening 120 of the spacer 100 to the inner side surface 101 of the spacer 100 is shorter than a distance from the center C of the opening 120 of the spacer 100 to the outer side surface 102 of the spacer 100.

The body portion 103 is disposed between the inner side surface 101 and the outer side surface 102, and connects the inner side surface 101 to the outer side surface 102.

The size (e.g., diameter) of the optical unit O of the first lens L1 may be substantially similar to the size (e.g., diameter) of the opening 120. Further, the size (e.g., diameter) of the optical unit O of the second lens L2 may be substantially similar to the size (e.g., diameter) of the opening 120.

When light passes through an opening in a conventional spacer to be relatively close to the inner side surface of the conventional spacer, a diffraction phenomenon may occur, which may cause a flare. In this case, the inner side surface of the spacer may be to an inner wall forming the opening of the conventional spacer.

The spacer 100 includes a protruding portion 110 protruding from the inner side surface 101 to prevent a flare. The protruding portion 110 includes a plurality of protrusions 110a.

The plurality of protrusions 110a may protrude from the inner side surface 101 of the spacer 100 toward the center C of the opening 120.

Figure 3:
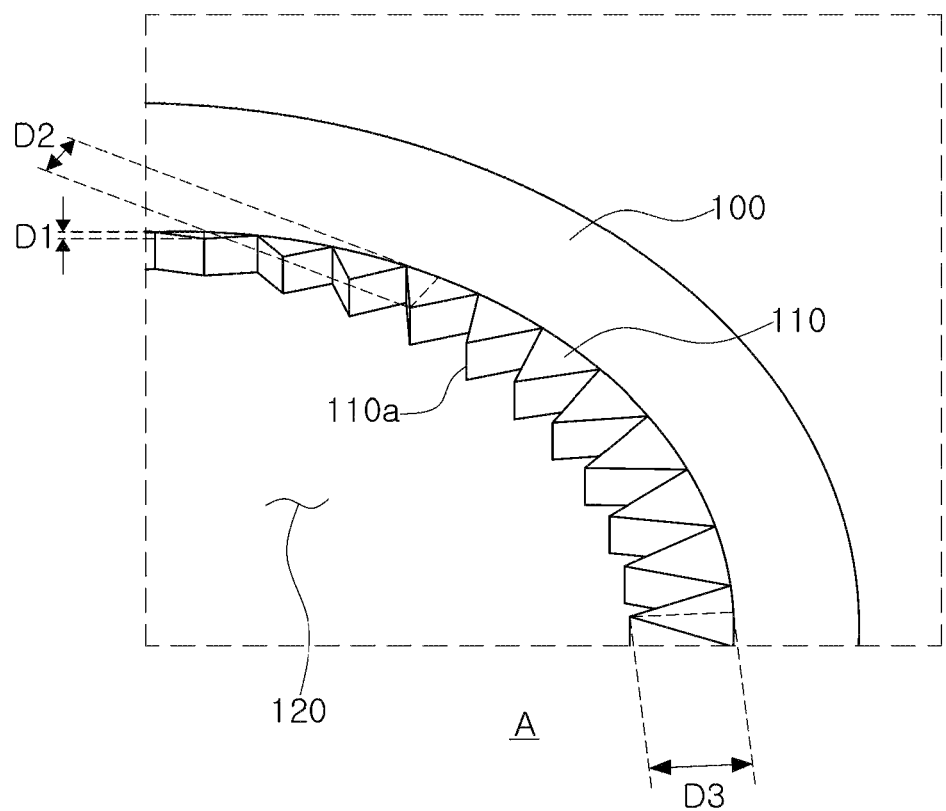
FIG. 3 is an enlarged view of part A of FIG. 2.

FIG. 2 is a perspective view of the spacer 100. FIG. 3 is an enlarged view of part A of FIG. 2.

Figure 4:
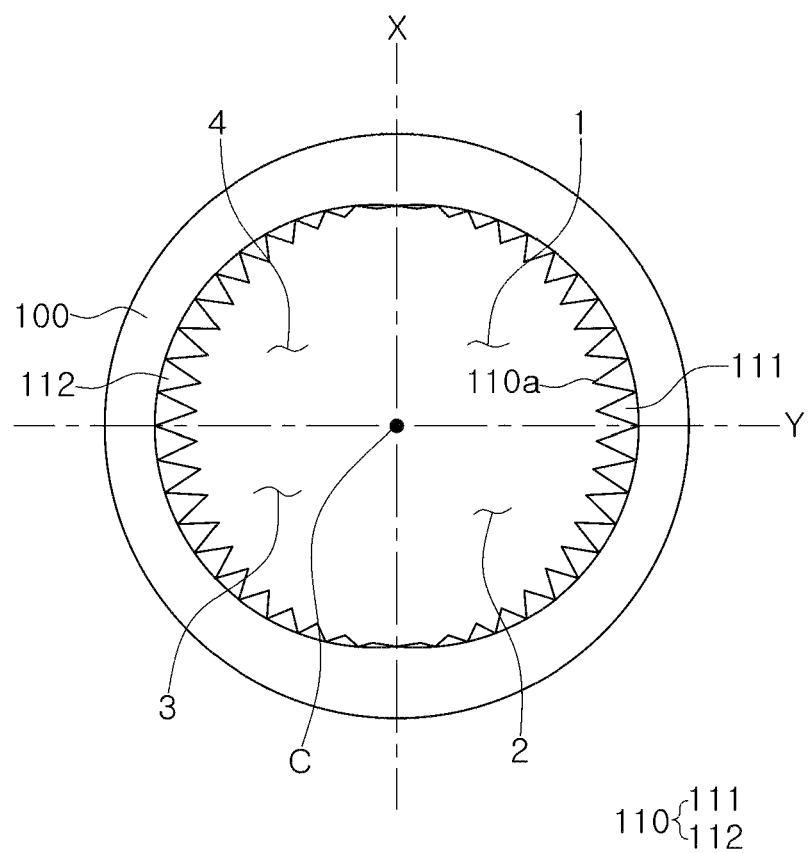
FIG. 4 is a plan view of the spacer of FIG. 2.
Figure 5:
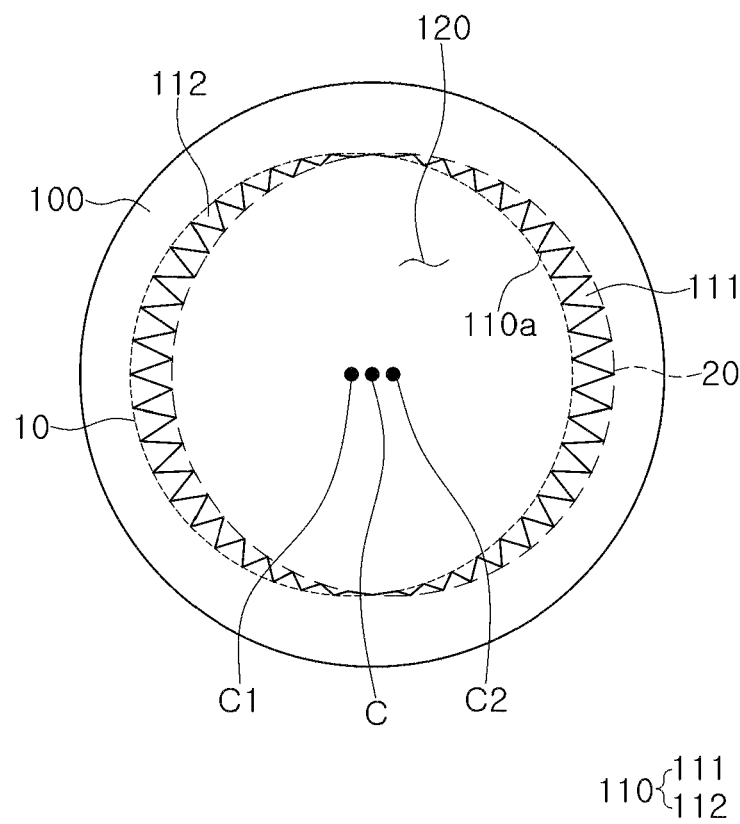
FIG. 5 is a view illustrating a shape of an opening of the spacer of FIG. 2.

FIG. 4 is a plan view of the spacer 100. FIG. 5 is a view illustrating a shape of the opening 120.

Referring to FIGS. 2 to 5, the protruding portion 110 including the plurality of protrusions 110a is disposed on the inner side surface 101 of the spacer 100. The plurality of protrusions 110a may be disposed in a circumferential direction, and may protrude from the inner side surface of the spacer 100 toward the center C of the spacer 100.

Lengths of the protrusions 110a vary in the circumferential direction. For example, the protrusions 110a respectively have a different length depending on the positions of the protrusions 110a. In this case, the "length" of each protrusion 110a may be a length by which each protrusion 110a extends from the inner side surface of the spacer 100 toward the center C of the spacer 100.

The protruding portion 110 may include a region in which the length of respective protrusions 110a increases in the circumferential direction and a region in which the length of respective protrusions 110a decreases in the circumferential direction. For example, protrusions 110a may alternately increase and decrease in lengths in the circumferential direction.

The protrusions 110a may have a sawtooth shape. For example, the planar shape of each of the protrusions 110a may have a triangular shape.

Referring to FIG. 3, the length of protrusions 110a in a partial region of the opening 120 may increase in one direction. For example, the length of protrusions 110a may increase in a clockwise direction.

When the length of a protrusion 110a located at the top of FIG. 3 is D1, the length of a protrusion 110a located at the rightmost side of FIG. 3 is D3, and the length of a protrusion 110a located therebetween is D2, the lengths of the protrusions 110a may satisfy D1<D2<D3.

Referring to FIG. 4, lengths of the protrusions 110a may repeatedly increase and decrease in a circumferential direction.

For example, referring to FIG. 4, the opening 120 may be divided into four regions. For example, when an X-Y Cartesian coordinate system based on the center C of the spacer 100 is defined, the opening 120 may be divided into a first region 1, a second region 2, a third region 3 and a fourth region 4 in a sequence clockwise from the upper right.

For example, the opening 120 may include the first region 1, the second region 2, the third region 3 and the fourth region 4, separated by a first axis (X axis) and a second axis (Y axis) intersecting on the center C of the opening 120 and perpendicular to each other.

The first region 1 and the third region 3 are located to be opposite to each other with respect to the center C of the opening 120, and the second region 2 and the fourth region 4 are located to be opposite to each other with respect to the center C of the opening 120.

The protrusions 110a disposed in the first region 1 increase in length in one direction, the protrusions 110a disposed in the second region 2 decrease in length in one direction, the protrusions 110a disposed in the third region 3 increase in length in one direction, and protrusions 110a disposed in the fourth region 4 may decrease in length in one direction. In this case, one direction may be a clockwise direction based on FIG. 4.

On the other hand, the protruding portion 110 may include a first protruding portion 111 disposed on one side of the inner side surface of the spacer 100, and a second protruding portion 112 disposed on the other side (e.g., the opposite side of one side with respect to the center C of the spacer 100) of the inner side of the spacer 100.

For example, based on the first axis (X axis) that intersects the central axis of the opening 120 and is perpendicular to the central axis of the opening 120, the first protruding portion 111 is disposed on one side of the first axis (X axis), and the second protruding portion 112 is disposed on the other side of the first axis (X axis).

The first protruding portion 111 may include a plurality of protrusions 110a disposed in the first region 1 and the second region 2, and the second protruding portion 112 may include a plurality of protrusions 110a disposed in the third region 3 and the fourth region 4.

The plurality of protrusions 110a included in the first protruding portion 111 and the second protruding portion 112 may increase and decrease in length in the circumferential direction.

Referring to FIG. 5, a center C1 of a first circle 10 having a curve connecting the vertices of the plurality of protrusions 110a included in the first protruding portion 111 as an arc, and a center C2 of the second circle 20 having a curve connecting the vertices of the plurality of protrusions 110a included in the second protruding portion 112 as an arc, are spaced apart from each other.

In this case, the vertex may be the farthest protruding portion of each protrusion. For example, the vertex may be a portion of each protrusion closest to the center C of the opening 120.

The first circle 10 and the second circle 20 have an intersection point. In addition, the diameter of the first circle 10 and the diameter of the second circle 20 may be the same.

The center C of the spacer 100 is located between the center C1 of the first circle 10 and the center C2 of the second circle 20.

For example, the center C1 of the first circle 10, the center C2 of the second circle 20, and the center C of the spacer 100 are disposed to be spaced apart from each other. For example, the center C1 of the first circle 10 is spaced apart from the center C of the spacer 100 to the left, and the center C2 of the second circle 20 is spaced apart from the center C of the spacer 100 to the right.

A distance between the center C of the spacer 100 and the center C1 of the first circle 10 may be the same as a distance between the center C of the spacer 100 and the center C2 of the second circle 20.

The protruding portion 110 is disposed in the space between the first circle 10 and the second circle 20. For example, in the first region 1 and the second region 2, the first protruding portion 111 is disposed in a space between the outer side of the first circle 10 and the inner side of the second circle 20. In the third and fourth regions 3 and 4, the second protruding portion 112 is disposed in a space between the inner side of the first circle 10 and the outer side of the second circle 20.

On the other hand, a diameter of a circle having an inner side surface of the spacer 100 located in the first region 1 and the second region 2 as an arc, and the diameter of the first circle 10, are the same. In this case, the circle having the inner side surface of the spacer 100 positioned in the first region 1 and the second region 2 as an arc may be to the second circle 20.

Similarly, a diameter of a circle having the inner side surface of the spacer 100 positioned in the third region 3 and the fourth region 4 as an arc, and the diameter of the second circle 20, are the same. In this case, the circle having the inner side surface of the spacer 100 positioned in the third region 3 and the fourth region 4 as an arc may be the first circle 10.

Figure 6A:
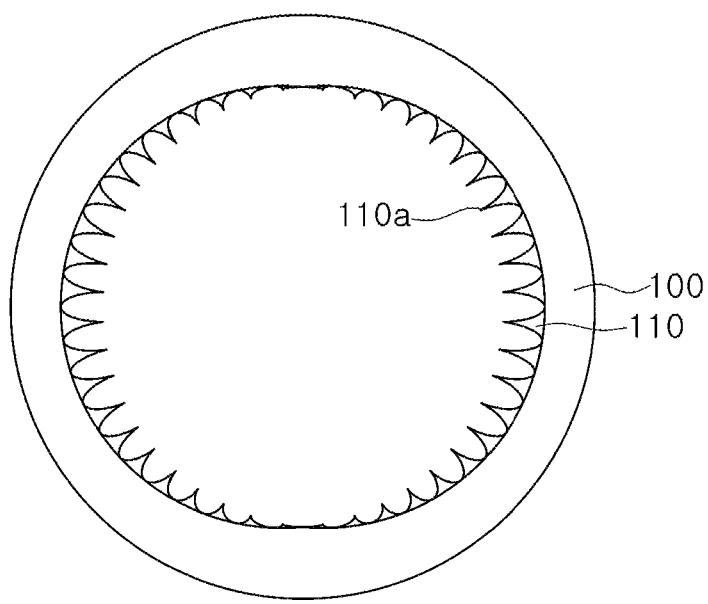
FIGS. 6A and 6B are modified examples of protrusions of the spacer of FIG. 2.
Figure 6B:
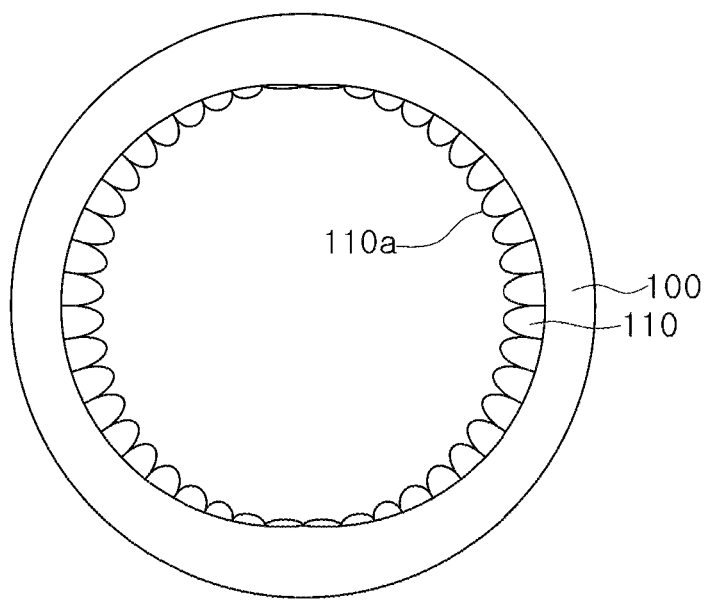

FIGS. 6A and 6B are modified examples of the plurality of protrusions 110a of the spacer 100 according to the first example.

Each protrusion 110a of the protruding portion 110 may include a curved surface. For example, referring to FIG. 6A, each protrusion 110a may include a concave curved surface. A portion in which the protrusions 110a are connected to each other may be formed to be concave with respect to the center C of the spacer 100.

Further, referring to FIG. 6B, each protrusion 110a may include a curved surface convex with respect to the center C of the spacer 100.

Figure 7:
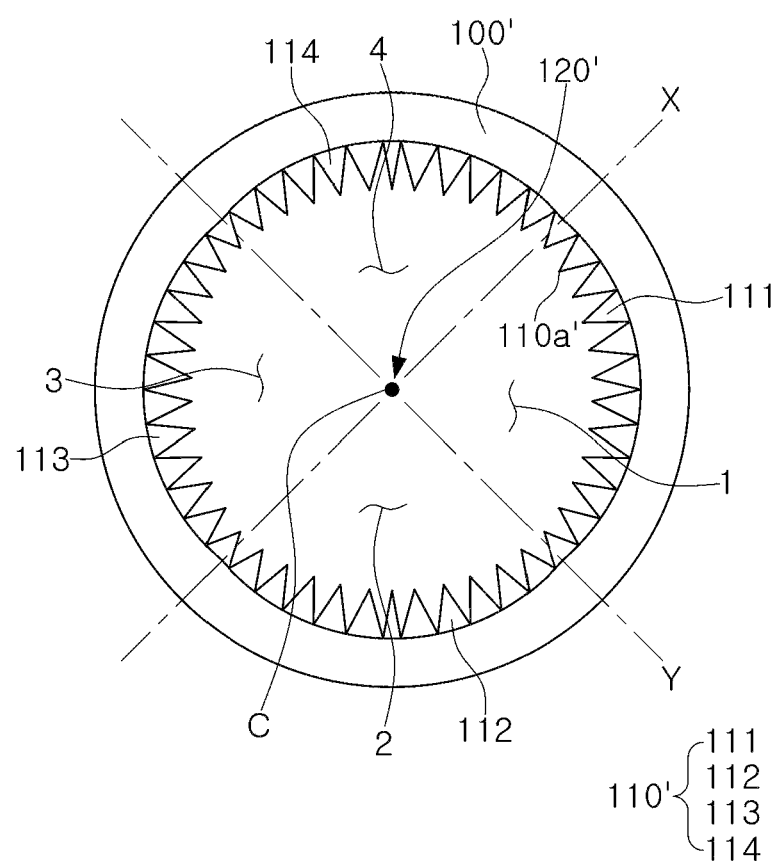
FIG. 7 is a plan view of a spacer, according to another example.
Figure 8:
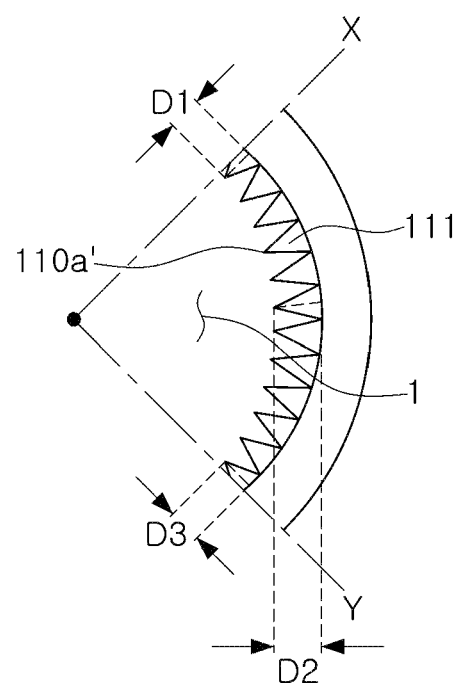
FIG. 8 is a plan view illustrating a portion of the spacer of FIG. 7.
Figure 9:
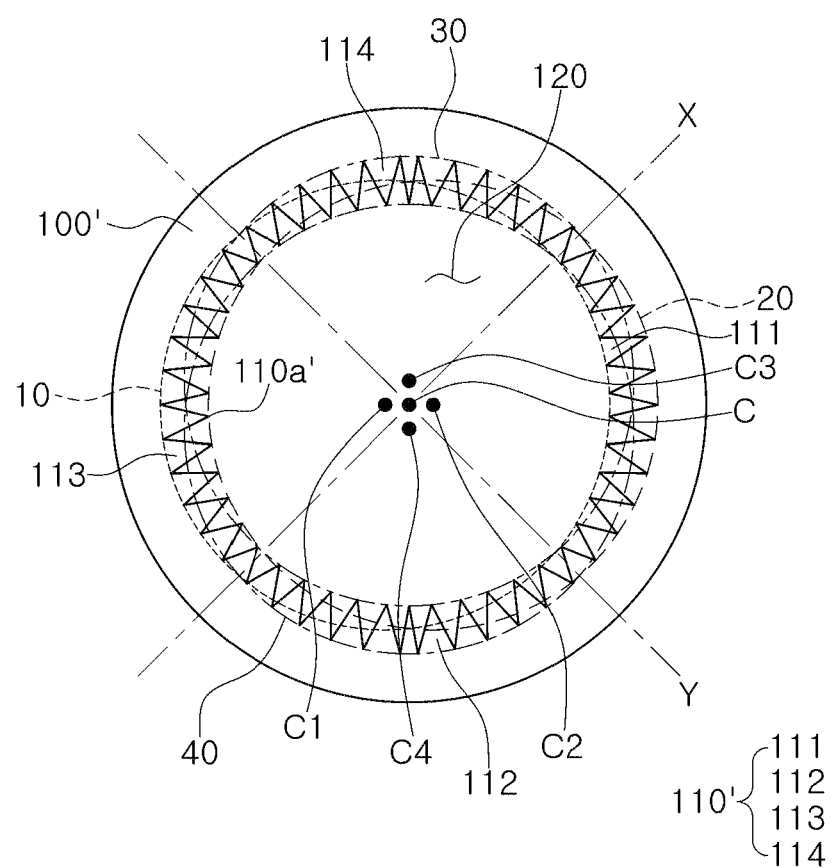
FIG. 9 is a view illustrating a shape of an opening of the spacer of FIG. 7.

FIG. 7 is a plan view of a spacer 100', according to another example. FIG. 8 is a plan view illustrating a portion of the spacer 100'. FIG. 9 is a drawing describing a shape of an opening of the spacer 100'.

The spacer 100' differs from the previously described spacer 100, in terms of a form in which lengths of protrusions of a protruding portion 110' vary.

As an example, referring to FIGS. 7 to 9, the protruding portion 110' includes a plurality of protrusions 110a', and is disposed on an inner side surface of the spacer 100'. The plurality of protrusions 110a' may be disposed in the circumferential direction, and may protrude toward the center C of the spacer 100' from the inner side surface of the spacer 100'.

The lengths of protrusions 110a' vary in the circumferential direction. For example, the protrusions 110a' have different lengths depending on the positions of the protrusions 110a'. In this case, the "length" of each protrusion 110a' may be a length in which each protrusion 110a' extends from the inner side surface of the spacer 100' toward the center C of the spacer 100'.

The protrusions 110a' may have a sawtooth shape. For example, the planar shape of each protrusion 110a' may be a triangular shape.

The protrusions 110a' may be repeatedly increased and decreased in length in the circumferential direction.

For example, referring to FIGS. 7 and 8, the opening 120 of the spacer 100' may be divided into four regions. For example, when an X-Y Cartesian coordinate system based on the center C of the spacer 100' is defined, the opening 120' of the spacer 100' may be divided into a first region 1, a second region 2, a third region 3, and a fourth region 4, clockwise from the right.

For example, the opening 120' may include the first region 1, the second region 2, the third region 3, and the fourth region 4, separated by a first axis (X axis) and a second axis (Y axis) intersecting the center C of the opening 120' and disposed perpendicular to each other.

The protrusions 110a' disposed in each region may increase and decrease in length in a clockwise direction.

For example, the protrusions 110a' disposed in the first region 1 may increase and then decrease in length in one direction, and the protrusions 110a' disposed in the second region 2 may increase and then decrease in length in one direction. The protrusions 110a' disposed in the third region 3 may increase and then decrease in length in one direction, and the protrusions 110a' disposed in the fourth region 4 may increase and then decrease in length in one direction. In this case, one direction may be a clockwise direction based on FIG. 7.

Referring to FIG. 8, a plurality of protrusions disposed in the first region 1 may increase and decrease in length in one direction.

When the length of the protrusion located at the top of FIG. 8 is D1, the length of the protrusion located at the rightmost side of FIG. 8 is D2, and the length of the protrusion located at the bottom of FIG. 8 is D3, D1<D2 and D3<D2 may be satisfied, and it may be D1=D3.

On the other hand, the protruding portion 110' includes a first protruding portion 111, a second protruding portion 112, a third protruding portion 113, and a fourth protruding portion 114. The first to fourth protruding portions 111 to 114 may be disposed in a sequence in the circumferential direction.

The protrusions included in the first to fourth protruding portions 111 to 114 may increase and then decrease in length in the circumferential direction.

The first protruding portion 111 and the third protruding portion 113 are disposed to be opposite to each other, based on the center C of the spacer 100', and the second protruding portion 112 and the fourth protruding portion 114 are disposed to be opposite each other based on the center C of the spacer 100'.

The first protruding portion 111 may include a plurality of protrusions 110a' disposed in the first region 1, and the second protruding portion 112 may include a plurality of protrusions 110a' disposed in the second region 2. The third protruding portion 113 may include a plurality of protrusions 110a' disposed in the third region 3, and the fourth protruding portion 114 may include a plurality of protrusions 110a' disposed in the fourth region 4.

Referring to FIG. 9, a center C1 of a first circle 10 having a curve connecting the vertices of the plurality of protrusions 110a' included in the first protruding portion 111 as an arc, and a center C2 of a second circle 20 having a curve connecting the vertices of the plurality of protrusions 110a' included in the third protruding portion 113 as an arc, are spaced apart from each other.

The first circle 10 and the second circle 20 have an intersection point. In addition, the diameter of the first circle 10 and the diameter of the second circle 20 may be the same.

The center C of the spacer 100' is located between the center C1 of the first circle 10 and the center C2 of the second circle 20.

For example, the center C1 of the first circle 10, the center C2 of the second circle 20, and the center C of the spacer 100' are spaced apart from each other. For example, the center C1 of the first circle 10 is spaced apart from the center C of the spacer 100' to the left, and the center C2 of the second circle 20 is spaced apart from the center C of the spacer 100' to the right.

A distance between the center C of the spacer 100' and the center C1 of the first circle 10 may be the same as a distance between the center C of the spacer 100' and the center C2 of the second circle 20.

The first protruding portion 111 and the third protruding portion 113 are disposed in a space between the first circle 10 and the second circle 20. For example, in the first region 1, the first protruding portion 111 is disposed in a space between the outer side of the first circle 10 and the inner side of the second circle 20. In the third region 3, the third protruding portion 113 is disposed in a space between the inner side of the first circle 10 and the outer side of the second circle 20.

A diameter of a circle having the inner side surface of the spacer 100' positioned in the first region 1 as an arc, and a diameter of the first circle 10, are the same as each other. In this case, the circle having the inner side surface of the spacer 100' positioned in the first region 1 as an arc may be the second circle 20.

Similarly, a diameter of a circle having the inner side surface of the spacer 100' positioned in the third region 3 as an arc, and the diameter of the second circle 20, are the same. In this case, the circle having the inner side surface of the spacer 100' positioned in the third region 3 as an arc may be the first circle 10.

A center C3 of a third circle 30 having a curve connecting the vertices of the plurality of protrusions 110a' included in the second protruding portion 112 as an arc, and a centers C4 of a fourth circle 40 having a curve connecting the vertices of the plurality of protrusions 110a' included in the fourth protruding portion 114 as an arc, are spaced apart from each other.

The third circle 30 and the fourth circle 40 have an intersection point. In addition, the diameter of the third circle 30 and the diameter of the fourth circle 40 may be the same.

The center C of the spacer 100' is located between the center C3 of the third circle 30 and the center C4 of the fourth circle 40.

For example, the center C3 of the third circle 30, the center C4 of the fourth circle 40, and the center C of the spacer 100' are spaced apart from each other. For example, the center C3 of the third circle 30 is spaced upwardly from the center C of the spacer 100', and the center C4 of the fourth circle 40 is spaced downwardly from the center C of the spacer 100'.

A distance between the center C of the spacer 100' and the center C3 of the third circle 30 may be the same as a distance between the center C of the spacer 100' and the center C4 of the fourth circle 40.

The second protruding portion 112 and the fourth protruding portion 114 are disposed in a space between the third circle 30 and the fourth circle 40. For example, in the second region 2, the second protruding portion 112 is disposed in a space between the outer side of the third circle 30 and the inner side of the fourth circle 40. In the fourth region 4, the fourth protruding portion 114 is disposed in a space between the inner side of the third circle 30 and the outer side of the fourth circle 40.

The center C of the spacer 100' is disposed at a position inside of positions of the center C1 of the first circle 10, the center C2 of the second circle 20, the center C3 of the third circle 30, and the center C4 of the fourth circle 40.

A diameter of a circle having the inner side surface of the spacer 100' positioned in the second region 2 as an arc, and a diameter of the third circle 30, are the same. In this case, the circle having the inner side surface of the spacer 100' positioned in the second region 2 as an arc may be the fourth circle 40.

Similarly, the diameter of the circle having the inner side surface of the spacer 100' positioned in the fourth region 4 as an arc is the same as the diameter of the fourth circle 40. In this case, the circle having the inner side surface of the spacer 100' positioned in the fourth region 4 as an arc may be the third circle 3.

Since the spacers 100 and 100' according to the examples have the protruding portions 110 and 110' which include a plurality of protrusions 110a and 110a' having varying lengths and which are provided on the inner side surfaces of the spacers 100 and 100', interference due to diffraction of light may be canceled, and accordingly, a flare may be prevented.

Figure 10A:
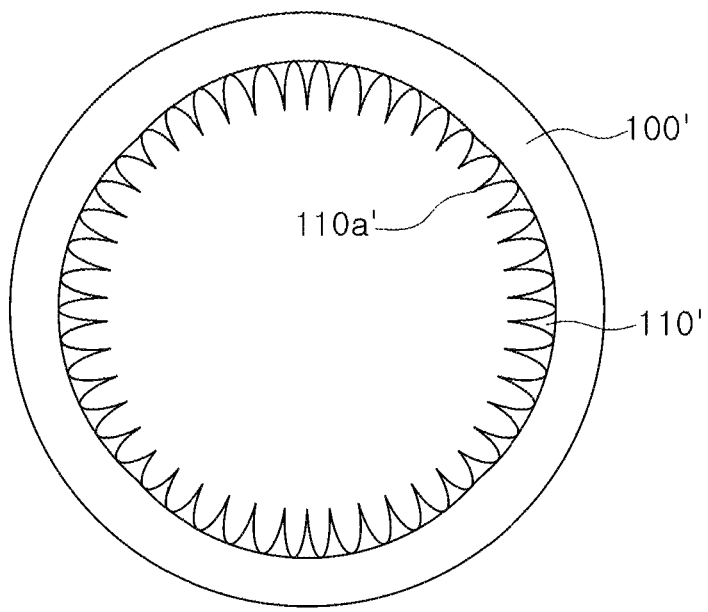
FIGS. 10A and 10B are modified examples of protrusions of the spacer of FIG. 7.
Figure 10B:
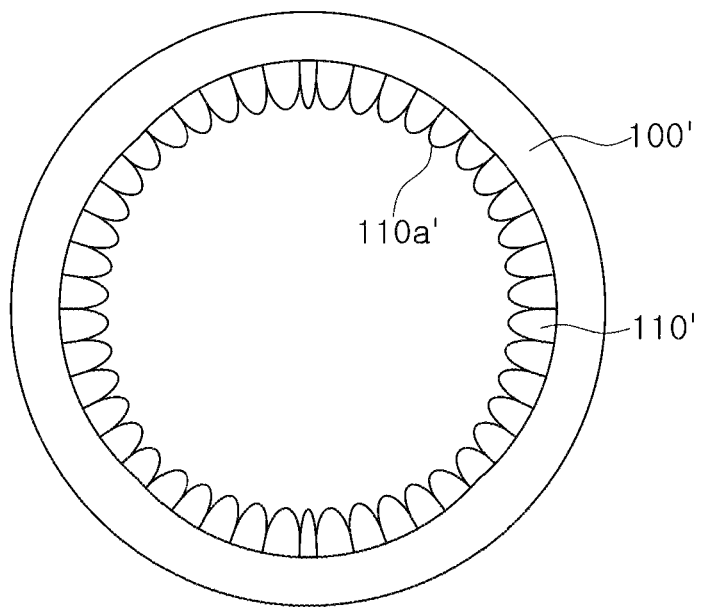

FIGS. 10A and 10B are modified examples of the plurality of protrusions 110a' of the spacer 110'.

Each protrusion 110a' may include a curved surface. For example, referring to FIG. 9A, each protrusion 110a' may include a concave curved surface. A portion in which the protrusions 110a' are connected to each other may be formed to be concave with respect to the center C of the spacer 100'.

In addition, referring to FIG. 9B, each protrusion 110a' may include a convex curved surface with respect to the center C of the spacer 100'.

According to examples disclosed herein, a spacer and a lens assembly including the spacer may prevent a flare.

While specific examples have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A spacer, comprising:
an opening through which light passes;
an inner side surface forming the opening; and
a protruding portion including a plurality of protrusions protruding from the inner side surface,
wherein lengths of the plurality of protrusions vary in a circumferential direction of the protruding portion, and
wherein a region in which lengths of protrusions, among the plurality of protrusions, increase in the circumferential direction and another region in which lengths of other protrusions, among the plurality of protrusions, decrease in the circumferential direction are alternately and repeatedly disposed along the circumferential direction.

2. The spacer of claim 1, wherein the opening includes a first region, a second region, a third region and a fourth region separated by a first axis and a second axis that intersect on a center of the opening and are disposed perpendicular to each other,
wherein the first region and the third region are located opposite to each other based on the center of the opening,
wherein the second region and the fourth region are located opposite to each other based on the center of the opening,
wherein lengths of protrusions, among the plurality of protrusions, disposed in the first region and the third region, increase in the circumferential direction, and
wherein lengths of protrusions, among the plurality of protrusions, disposed in the second region and the fourth region decrease in the circumferential direction.

3. The spacer of claim 1, wherein the protruding portion further includes a first protruding portion disposed on one side of a first axis and a second protruding portion disposed on another side of the first axis, the first axis intersecting a central axis of the opening and being perpendicular to the central axis of the opening, and
wherein lengths of protrusions, among the plurality of protrusions, included in the first protruding portion and lengths of protrusions, among the plurality of protrusions, included in the second protruding portion increase and then decrease in the circumferential direction.

4. The spacer of claim 3, wherein a center of a first circle having an arc as a curve connecting vertices of the protrusions included in the first protruding portion, and a center of a second circle having an arc as a curve connecting vertices of the protrusions included in the second protruding portion, are spaced apart from each other.

5. The spacer of claim 4, wherein a center of the opening is disposed between the center of the first circle and the center of the second circle.

6. The spacer of claim 4, wherein the first circle and the second circle have an intersection point,
wherein the first protruding portion is disposed in a space between an outer side of the first circle and an inner side of the second circle, and
wherein the second protruding portion is disposed in a space between an inner side of the first circle and an outer side of the second circle.

7. The spacer of claim 4, wherein a diameter of the first circle and a diameter of the second circle are equal.

8. The spacer of claim 1, wherein each protrusion among the plurality of protrusions includes a convex curved surface or a concave curved surface.

9. The spacer of claim 1, wherein the protruding portion further includes a first protruding portion, a second protruding portion, a third protruding portion, and a fourth protruding portion disposed in a sequence in the circumferential direction, and
wherein lengths of protrusions, among the plurality of protrusions, included in each of the first to fourth protruding portions increase and then decrease in the circumferential direction.

10. The spacer of claim 9, wherein the first protruding portion and the third protruding portion are located opposite to each other with respect to a center of the opening, and the second protruding portion and the fourth protruding portion are located opposite to each other with respect to the center of the opening, and
wherein a center of a first circle having an arc as a curve connecting vertices of the protrusions included in the first protruding portion, and a center of a second circle having an arc as a curve connecting vertices of the protrusions included in the third protrusion, are spaced apart from each other.

11. The spacer of claim 10, wherein a center of a third circle having an arc as a curve connecting vertices of the protrusions included in the second protruding portion, and a center of a fourth circle having an arc as a curve connecting vertices of the protrusions included in the fourth protruding portion, are spaced apart from each other.

12. The spacer of claim 11, wherein the center of the opening is disposed at a position inside of positions of the center of the first circle, the center of the second circle, the center of the third circle, and the center of the fourth circle.

13. The spacer of claim 11, wherein the first circle and the second circle have an intersection point,
wherein the first protruding portion is disposed in a space between an outer side of the first circle and an inner side of the second circle, and
wherein the third protruding portion is disposed in a space between an inner side of the first circle and an outer side of the second circle.

14. The spacer of claim 11, wherein the third circle and the fourth circle have an intersection point,
wherein the second protruding portion is disposed in a space between an outer side of the third circle and an inner side of the fourth circle, and
wherein the fourth protruding portion is disposed in a space between an inner side of the third circle and an outer side of the fourth circle.

15. A lens assembly, comprising:
a lens barrel;
a first lens and a second lens disposed along an optical axis inside of the lens barrel; and
a spacer disposed between the first lens and the second lens, and having an opening,
wherein a protruding portion including a plurality of protrusions protruding toward a center of the opening is disposed on an inner side surface of the spacer forming the opening,
wherein lengths of the plurality of protrusions vary in a circumferential direction of the protruding portion, and
wherein a region in which lengths of protrusions, among the plurality of protrusions, increase in the circumferential direction and another region in which lengths of other protrusions, among the plurality of protrusions, decrease in the circumferential direction are alternately and repeatedly disposed along the circumferential direction.

16. A lens assembly, comprising:
a first lens disposed in a lens barrel;
a second lens disposed in the lens barrel and stacked on the first lens in an optical axis direction; and
a spacer disposed between the first lens and the second lens in the optical axis direction,
wherein the spacer comprises:
a ring-shaped body having an inner side surface bounding an opening configured to allow light to pass through the spacer in the optical axis direction; and
a plurality of protrusions extending toward a center of the opening in a plane perpendicular to the optical axis direction,
wherein lengths of the plurality of protrusions in directions toward the center of the opening vary, and
wherein a region in which lengths of protrusions, among the plurality of protrusions, increase in a circumferential direction and another region in which lengths of other protrusions, among the plurality of protrusions, decrease in the circumferential direction are alternately and repeatedly disposed along the circumferential direction.

17. The lens assembly of claim 16, wherein lengths, in the directions toward the center of the opening, of protrusions, among the plurality of protrusions, increase in a circumferential direction of the ring-shaped body, and
wherein lengths, in the directions toward the center of the opening, of other protrusions, among the plurality of protrusions, decrease in the circumferential direction of the ring-shaped body.

18. The lens assembly of claim 16, wherein the lengths of the plurality of protrusions alternately increase and decrease in the circumferential direction, repeatedly, of the ring-shaped body.

19. The lens assembly of claim 16, wherein each protrusion, among the plurality of protrusions, has any one of a sawtooth shape, a convex curved surface, and a concave curved surface.

* * * * *